United States Patent [19]

Enoki

[11] Patent Number: 4,699,243
[45] Date of Patent: Oct. 13, 1987

[54] VIBRATION ISOLATING PIPE

[75] Inventor: Shigenaga Enoki, Saitama, Japan

[73] Assignee: Honda Giken Kogyo Kabushiki Kaisha, Tokyo, Japan

[21] Appl. No.: 822,702

[22] Filed: Jan. 27, 1986

[30] Foreign Application Priority Data

Jan. 28, 1985 [JP] Japan .................................. 60-10097

[51] Int. Cl.[4] ............................................. F16F 15/00
[52] U.S. Cl. .................................. 181/207; 138/151; 138/156; 180/312
[58] Field of Search .................................. 181/207–209, 181/227, 228, 240, 247, 248, 252, 230; 138/149, 151, 156; 180/312

[56] References Cited

U.S. PATENT DOCUMENTS

| | | | |
|---|---|---|---|
| 446,663 | 2/1891 | Denney | 138/151 X |
| 2,671,522 | 3/1954 | Bourgeois | 181/293 |
| 3,117,902 | 1/1964 | Holzheimer | 138/149 X |
| 3,144,913 | 8/1964 | Bailey | 181/248 |
| 3,557,840 | 1/1971 | Maybee | 138/149 |
| 3,860,258 | 1/1975 | Feustel et al. | 180/312 |
| 3,918,530 | 11/1975 | Nyholm | 181/207 X |
| 4,190,131 | 2/1980 | Robinson | 181/207 X |
| 4,192,352 | 3/1980 | Hakamada et al. | 138/149 |
| 4,296,830 | 10/1981 | Rossander et al. | 181/208 |
| 4,359,865 | 11/1982 | Nakao et al. | 181/240 X |
| 4,576,206 | 3/1986 | Lauren | 138/149 |

FOREIGN PATENT DOCUMENTS 3124249  12/1982  Fed. Rep. of Germany ...... 181/230

Primary Examiner—Benjamin R. Fuller
Attorney, Agent, or Firm—Lyon & Lyon

[57] ABSTRACT

A vibration isolating pipe wherein slits are cut along the axis of the pipe and the friction of the slit surfaces absorb vibrations. Applications are made to a motorcycle body frame and a motorcycle exhaust pipe.

7 Claims, 7 Drawing Figures

VIBRATION ISOLATING PIPE

BACKGROUND OF THE INVENTION

The field of the present invention is vibration reduction devices.

The structural parts of machinery often causes noise vibrations or structural vibrations that must be reduced in order for the machinery to be effective. Various means for controlling vibrations have been proposed. For example, in order to control the noise vibrations that exist in the exhaust pipes of motorcycles, material having concave surfaces is added to the inside or the outside of the pipes. Vibration isolating blocks and other similar devices are also commonly employed. However, such vibration control means require extra material or elements which can add weight, cost and complications for assembly.

SUMMARY OF THE INVENTION

The present invention relates to a vibration control device for machinery structural members particularly those of tubular shape which reduces vibrations without requiring extra material or elements. The present invention accomplishes this result by providing closed grooves on the inside of a pipe such a tubular member, hereinafter referred to as a "pipe" such that the friction between the groove surfaces acts as a vibration damper. Therefore, no extra material is required in order to accomplish vibration reduction and the advantages of lighter weight and reduced cost are obtained.

Accordingly, it is an object of the present invention to provide an improved vibration reduction device. Other and further objects and advantages will appear hereinafter.

DETAILED DESCRIPTION OF THE PREFERRED EMBODIMENT

Figure 1:
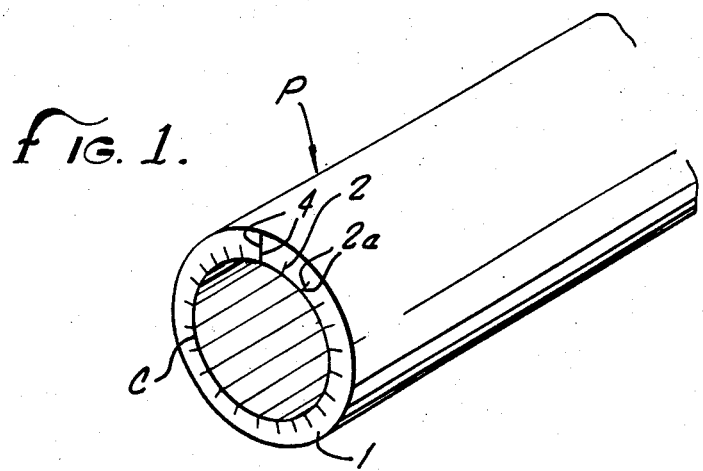
FIG. 1 is a perspective view of one embodiment of the present invention.

Turning in detail to the drawings, FIG. 1 illustrates a vibration isolating pipe P with a pipe wall 1 of uniform thickness. Slits 2 on the inside of the pipe wall 1 are equidistant from one another around the inner circumference C of the pipe P. There are two slit surfaces 2a for each slit 2 which are designed to be in contact with one another.

Figure 2B:
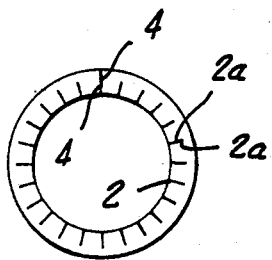
FIG. 2B is an end view of the plate of FIG. 2A rolled into a pipe.
Figure 2A:
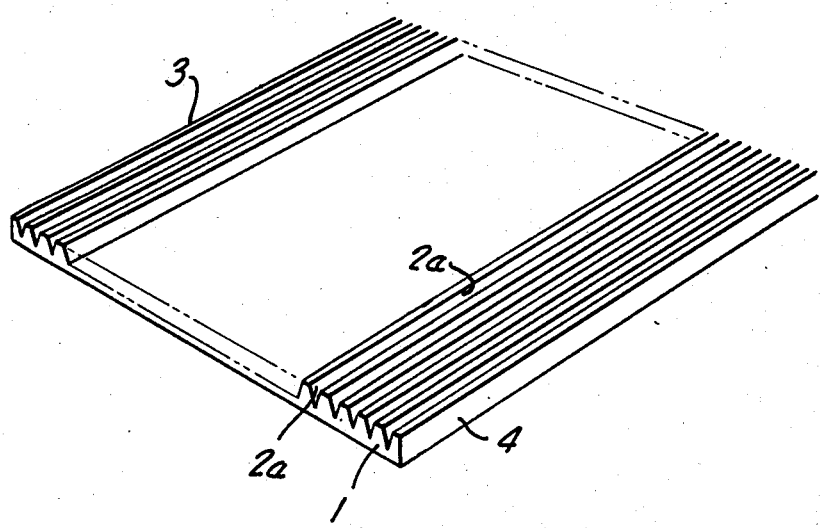
FIG. 2A is a perspective view of a plate used in the manufacture of the embodiment of FIG. 1.

FIG. 2a illustrates a plate 3 which is used to construct the vibration isolating pipe P of FIG. 1. A sequence of opposed slit surfaces 2a are formed in the plate 3 at an angle such that adjoining or opposed slit surfaces 2a meet at a point partially through the plate 3. The angle between adjoining slit surfaces is such that these surfaces 2a will be in contact when a pipe is constructed from the plate. To have the slits meet upon forming a pipe, the slits 2 in the plate 3 run parallel to the intended axis of the pipe to be formed. The plate 3 is then rolled until the edges 4 of the plate 3 meet one another and the adjoining slit surfaces 2a are in contact. The abutting edges 4 are then welded together forming the vibration isolating pipe P as illustrated in FIG. 1.

In operation, the pipe P is to be employed where it will be subject to objectionable vibration. Energy from such vibrations is received by the slits 2 and along the slit surfaces 2a. The friction between the slit surfaces 2a then absorbs energy to act as a vibration damper, thus reducing substantially the magnitude of the vibrations transmitted through or along the wall of the pipe P.

Figure 3:
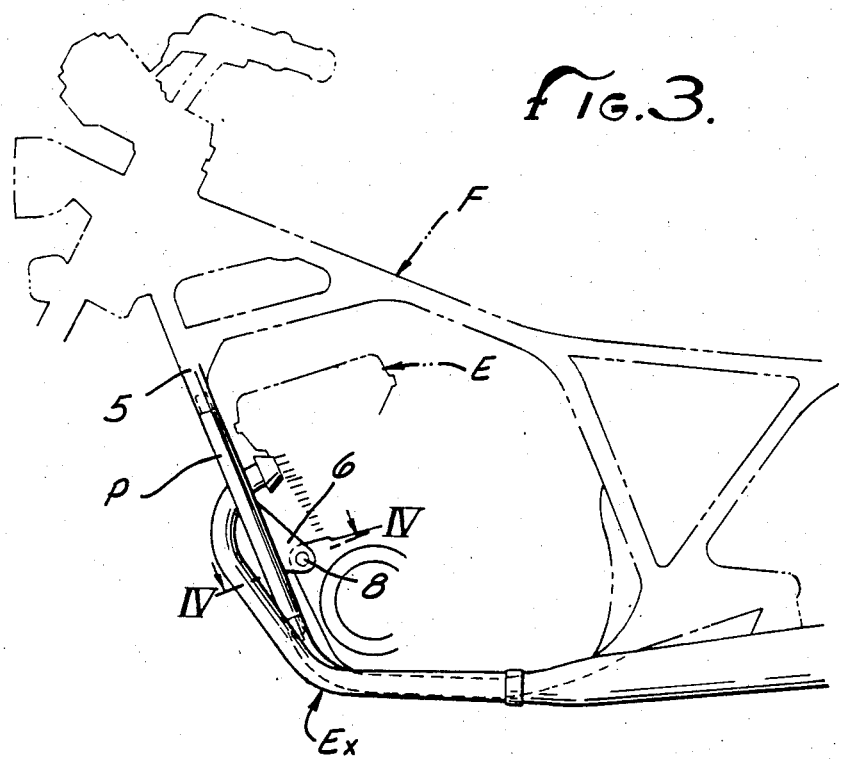
FIG. 3 is a side view of one application of the present invention.
Figure 4:
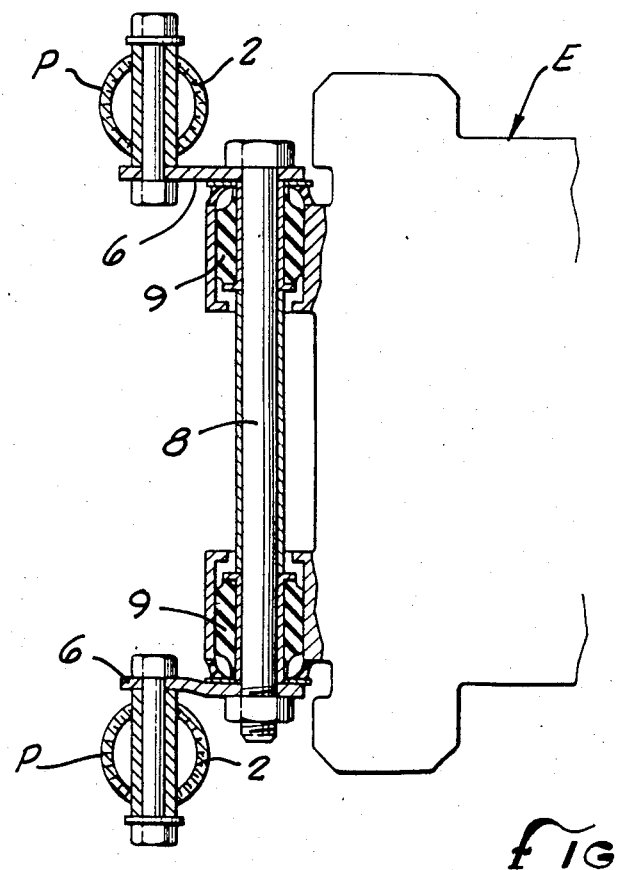
FIG. 4 is a top sectional view of the application of FIG. 3 taken along line IV—IV of that figure.

FIG. 3 and FIG. 4 illustrate an application of the vibration isolating pipe P in which it is used to dampen the vibrations in the body frame F of a motorcycle. Vibrations during operation can be detrimental to the operation and longevity of the vehicle. Therefore, it is advantageous to reduce vibrations in the body frame of a motorcycle as much as possible. The vibration isolating pipe P helps to accomplish that result when it is employed as part of the down tube 5 of the body frame F. The down tube 5 and the vibration isolating pipe P are connected to a support bracket 8 for the engine E by engine hangers 6. The support pipe 8 is in turn connected to the engine E by rubber mounts 9. The vibrations which would otherwise be imparted through the aforementioned connections from the engine E to the body frame F are dissipated by the vibration isolating P by means of the slits 2.

Figure 5:
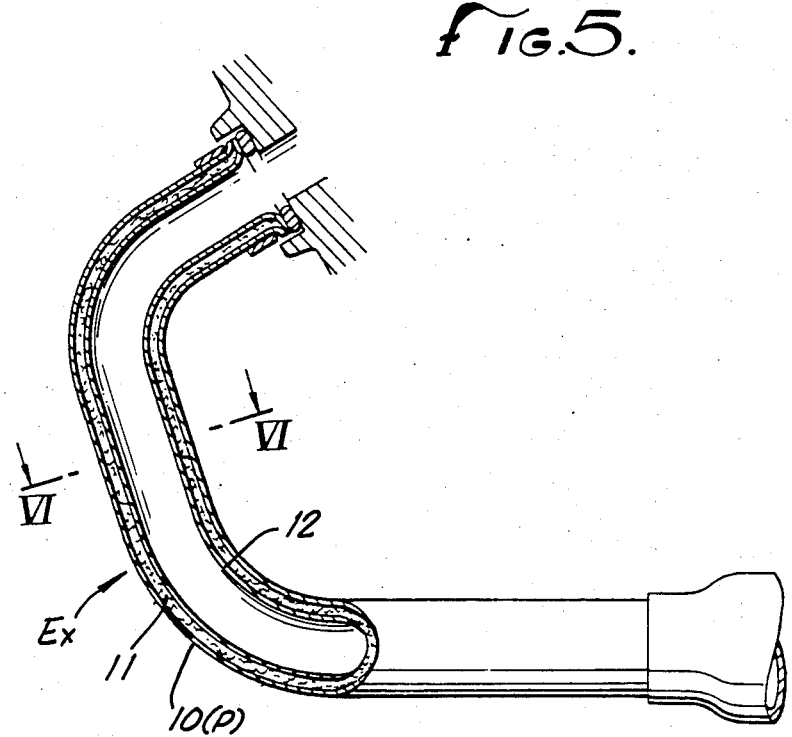
FIG. 5 is a side sectional view of another application of the present invention.
Figure 6:
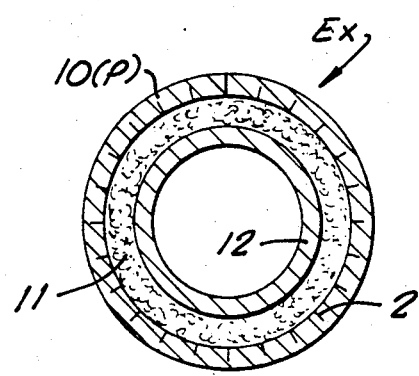
FIG. 6 is a top sectional view taken along line VI—VI of FIG. 5.

FIG. 5 and FIG. 6 depict an application of the vibration isolating pipe 10 (P) in which it is used to reduce the noise vibrations emanating from an exhaust pipe Ex. In order to comply with governmental noise standards and make the motorcycle more marketable, the reduction of engine exhaust noise becomes essential. The vibration isolating pipe 10 (P) accomplishes that result when it is placed around the internal (exhausting) pipe 12. The external vibration isolating pipe 10 (P) is protected from the high temperatures generated by the engine exhaust by the glass wool 11 which is placed between the external pipe 10 (P) and the internal pipe 12. The external vibration isolating pipe 10 (P) absorbs noise vibrations emanating from the internal (exhausting) pipe 12.

Thus a vibration isolating pipe is disclosed. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A tubular structural member formed of a rigid, strength-imparting material having a propensity to transmit vibrations to which it is subjected and means for damping said vibrations, said means comprising:
    a plurality of slits spacedly disposed about the circumference of said member and extending from the inner toward the outer wall,
    said slits defining oppositely facing surfaces disposed in contiguous relation with respect to one another.
2. The tubular structural member as recited in claim 1 in which said slits extend substantially radially from said inner wall.

3. The tubular structural member as recited in claim 2 in which said slits are disposed on substantially uniform circumferential spacing.

4. The tubular structural member as recited in claim 3 in which said slits extend substantially parallel to the longitudinal axis of said member.

5. The tubular structural member as recited in claim 4 in which said slits are substantially coextensive with said member axis.

6. A vehicle frame having interconnected tubular structural members formed of a rigid, strength-imparting material having a propensity to transmit vibrations, said frame including means for damping vibrations comprising at least one of said tubular structural members containing a plurality of radially extending slits spacedly disposed about the circumference of said member and extending from the inner toward the outer wall thereof, said slits defining oppositely facing surfaces disposed in contiguous relation with respect to one another, whereby vibrations to which said at least one structural member is subjected are damped by friction forces developed between said contiguous surfaces.

7. The vehicle frame as recited in claim 6 in which said slits are disposed on substantially uniform circumferential spacing about said at least one structural member.

* * * * *